(12) United States Patent
Orandi et al.

(10) Patent No.: US 9,507,993 B2
(45) Date of Patent: *Nov. 29, 2016

(54) STANDARD CALIBRATION TARGET FOR CONTACTLESS FINGERPRINT SCANNERS

(71) Applicant: The United States of America, as represented by the Secretary of Commerce, The National Institute of Standards and Technology, Washington, DC (US)

(72) Inventors: Shahram Orandi, Potomac, MD (US); Fred Byers, Knoxville, MD (US); Stephen Harvey, Gaithersburg, MD (US); Michael D. Garris, Boyds, MD (US); Stephen S. Wood, Chevy Chase, MD (US); John M. Libert, Rockville, MD (US); Jin Chu Wu, Frederick, MD (US)

(73) Assignee: The United States of America, as represented by the Secretary of Commerce, The National Institute of Standards and Technology, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/995,574

(22) Filed: Jan. 14, 2016

(65) Prior Publication Data
US 2016/0203355 A1    Jul. 14, 2016

Related U.S. Application Data

(62) Division of application No. 13/623,898, filed on Sep. 21, 2012, now Pat. No. 9,349,033.

(60) Provisional application No. 61/537,163, filed on Sep. 21, 2011.

(51) Int. Cl.
*G06K 9/00* (2006.01)
*H04N 13/02* (2006.01)
*H04N 17/00* (2006.01)

(52) U.S. Cl.
CPC ....... *G06K 9/00033* (2013.01); *G06K 9/00013* (2013.01); *G06K 9/00073* (2013.01); *G06K 9/00087* (2013.01); *H04N 13/0246* (2013.01); *H04N 17/002* (2013.01)

(58) Field of Classification Search
CPC .............. G06K 9/78; G06K 9/00013; G06K 9/00033; G06K 9/00201; G01D 3/08
USPC ....................................................... 382/124
See application file for complete search history.

(56) References Cited

U.S. PATENT DOCUMENTS 6,122,394 A * 9/2000 Neukermans ........ G02B 26/085
356/71
6,137,893 A * 10/2000 Michael ................ G06T 7/0018
348/87

(Continued)

OTHER PUBLICATIONS

Ross et al., "A Thin-Plate Spline Calibration Model for Fingerprint Sensor Interoperability", IEEE Transactions on Knowledge and Data Eniigneering, vol. 20, No. 8, pp. 1097-1110, Aug. 2008.*

(Continued)

*Primary Examiner* — Samir Ahmed
(74) *Attorney, Agent, or Firm* — Kevin Soules; Kermit D. Lopez; Luis M. Ortiz

(57) ABSTRACT

A contactless, three-dimensional fingerprint scanner apparatus, method, and system are described. The contactless fingerprint scanner can provide either, or both, topographical contrast of three-dimensional fingerprint features and optical contrast of a three-dimensional fingerprint surface. Data captured from scanning of a target with known geometric features mimicking fingerprint features can be examined as images or surface plots and analyzed for fidelity against the known target feature specifications to evaluate or validate device capture performance as well as interoperability. The target can be used by scanner vendors and designers to validate their devices, as well as to perform type certification.

12 Claims, 3 Drawing Sheets

(56) References Cited

U.S. PATENT DOCUMENTS

| | | | |
|---|---|---|---|
| 6,281,931 B1* | 8/2001 | Tsao | H04N 5/3572 348/247 |
| 6,327,047 B1* | 12/2001 | Motamed | H04N 1/00002 358/1.15 |
| 6,658,164 B1* | 12/2003 | Irving | G06K 9/00026 382/167 |
| 9,349,033 B2* | 5/2016 | Orandi | G06K 9/00013 |
| 2001/0026632 A1* | 10/2001 | Tamai | G06K 9/00 382/116 |
| 2009/0080709 A1* | 3/2009 | Rowe | G06K 9/00013 382/115 |
| 2009/0245591 A1* | 10/2009 | Rowe | G06K 9/2018 382/115 |
| 2011/0007951 A1* | 1/2011 | Mil'shtein | G06K 9/00033 382/124 |

OTHER PUBLICATIONS

Milshtein et al., "Application of Contactless Fingerprintg", book in Tech Open, Chapter 6, Published Jul. 27, 2011.*

* cited by examiner

STANDARD CALIBRATION TARGET FOR CONTACTLESS FINGERPRINT SCANNERS

CROSS-REFERENCE TO PROVISIONAL APPLICATION

This patent application is a divisional application of U.S. patent application Ser. No. 13/623,898, filed Sep. 21, 2012, entitled "STANDARD CALIBRATION TARGET FOR CONTACTLESS FINGERPRINT SCANNERS," which claims priority to U.S. Provisional Patent Application Ser. No. 61/537,163, entitled "STANDARD CALIBRATION TARGET FOR CONTACTLESS FINGERPRINT SCANNERS", filed Sep. 21, 2011, and both disclosures are incorporated herein by reference in their entirety.

TECHNICAL FIELD

Embodiments relate to data-processing systems and methods. Embodiments further relate to both contactless or contact-based biometric sensing and/or scanning of fingerprints. Embodiments also relate to enhanced three-dimensional fingerprint sensing and/or scanning and identification.

BACKGROUND OF THE INVENTION

Fingerprint scanning and matching is a reliable method for personal identification (one-to-many) or verification (one-to-one). Fingerprints can be scanned, analyzed, and stored in a database for future reference and identification purposes.

Most fingerprint scanners require that a person physically contact the scanning device. Typically, a person places a finger or multiple fingers or entire hand on a platen of a fingerprint scanner while the finger/fingers/hand is scanned and fingerprint data is collected. Physical contact with a fingerprint scanning device is highly problematic. These contact-based scanning devices predominantly have a single monolithic planar platen. Because of the anthropometrics of the human hand and the relative placement of the fingerprints on the fingers, capturing the fingerprints of all five fingers at the same time is not possible with most such devices. Physical contact with a fingerprint scanning device enables contaminant and pathogen transfer between multiple people using the same device. Additionally, residue left on the platen after physical contact can degrade fingerprint scanning performance and subsequently, fingerprint analysis and fingerprint matching capability. As a result, the operation of contact-based scanning devices periodically needs to be stopped for platen cleaning to ensure optimal device performance. To mitigate some of the shortfalls of contact-based scanners, a new generation of contactless scanners has emerged. Typically, a person positions and holds one or both hands, or one or more fingers in the acquisition aperture of a contactless scanner for the scanner to capture those fingerprints. The typical contactless scanner requires either no physical contact between the person and the fingerprint scanner, or minimal contact via some sort of arm or wrist pedestal to aid in the positioning and steadying of the hand or finger.

Current contactless fingerprint scanners are also problematic. Most contactless fingerprint scanners generate a two-dimensional image by first capturing one or more fingers or hands in three dimensions and then flattening the three dimensional image using some sort of data convolution process. This convolution process can make certain assumptions for the geometry of the three dimensional scan that may introduce error in the flattening process. Additionally, due to the difficulty in locking onto and acquiring an image in three-dimensional volumetric spaces, a contactless scanner may introduce distortion to the various parts of a fingerprint when capturing its image. The two-dimensional capture processes are also prone to distortion and fidelity problems. In order to ensure fidelity of the captured image with respect to the original fingerprint sample, a series of calibration targets and tests have been developed for use with two-dimensional scanners. These calibration targets and tests are designed to allow for the detection, and where possible, the calibration and correction of these anomalies. No such calibration targets exist for three-dimensional contactless scanners.

The Department of Homeland Security ("DHS") and the United States Visitor and Immigrant Status Indicator Technology ("US-VISIT") programs are undergoing the migration from a two-print capture process (i.e., left and right index fingers). Many other stakeholders involved in the capture of fingerprints are also moving from capturing individual fingers to build a set of ten fingers. These stakeholders are switching from capturing individual fingers to a slap fingerprint capture process (i.e., capturing all the fingers on each hand at once). The slap capture process decreases complexity in the fingerprint capture task by reducing the number of discrete capture steps from ten or more to just two or three (i.e., left hand and right hand, or left four-fingers, right four fingers and both thumbs), can reduce errors by reducing the chance of errors in the sequence of capturing individual prints, and can also reduce fingerprint acquisition times by capturing more than one finger at a time. Furthermore, by eliminating the need for physical contact through the use of a contactless scanner, the process can be further optimized by allowing capture of all fingers from both hands which would not otherwise be possible due to anthropometric challenges of flat-platen devices, as well as mitigate concerns regarding pathogen transfer.

Calibration targets and test tools have been developed for two-dimensional scanners, but no such targets exist to measure the operational fidelity of these new three-dimensional scanners to the original fingerprint.

Therefore, a need exists for a contactless three-dimensional fingerprint scanner that provides for improved, validated, and repeatable image capture. This image capture can include acquiring either the topographical measurements and/or contrast of three-dimensional fingerprint features and/or optical contrast of the three-dimensional fingerprint surface in three-dimensional space, or capturing a two-dimensional representation of a three dimensional finger by measuring either the three-dimensional fingerprint features and/or optical contrast in part and not limited to, for use in identification and identification matching, three dimensional fingerprint scanner calibration testing and three dimensional fingerprint scanner calibration correction.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide for improved data-processing systems and methods.

It is another aspect of the disclosed embodiments to provide for biometric scanning of fingerprints.

It is a further aspect of the disclosed embodiments to provide for three-dimensional fingerprint scanning and identification. The above and other aspects can be achieved as is now described. A contactless, three-dimensional fingerprint scanner target apparatus, method, and system are described. The contactless fingerprint scanner provides improved fidelity of both topographical features of three-dimensional fingerprint features and optical contrast of the three-dimensional fingerprint surface by use of calibration targets illustrated in the disclosed embodiments. Calibration targets are intended to be scanned by fingerprint scanning devices. Calibration target images generated from the data captured by scanning the target can then be analyzed against known calibration target feature specifications to evaluate or validate device capture fidelity repeatability as well as interoperability. The calibration targets can also enable scanner vendors and designers to validate their devices, as well as to perform type certification.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
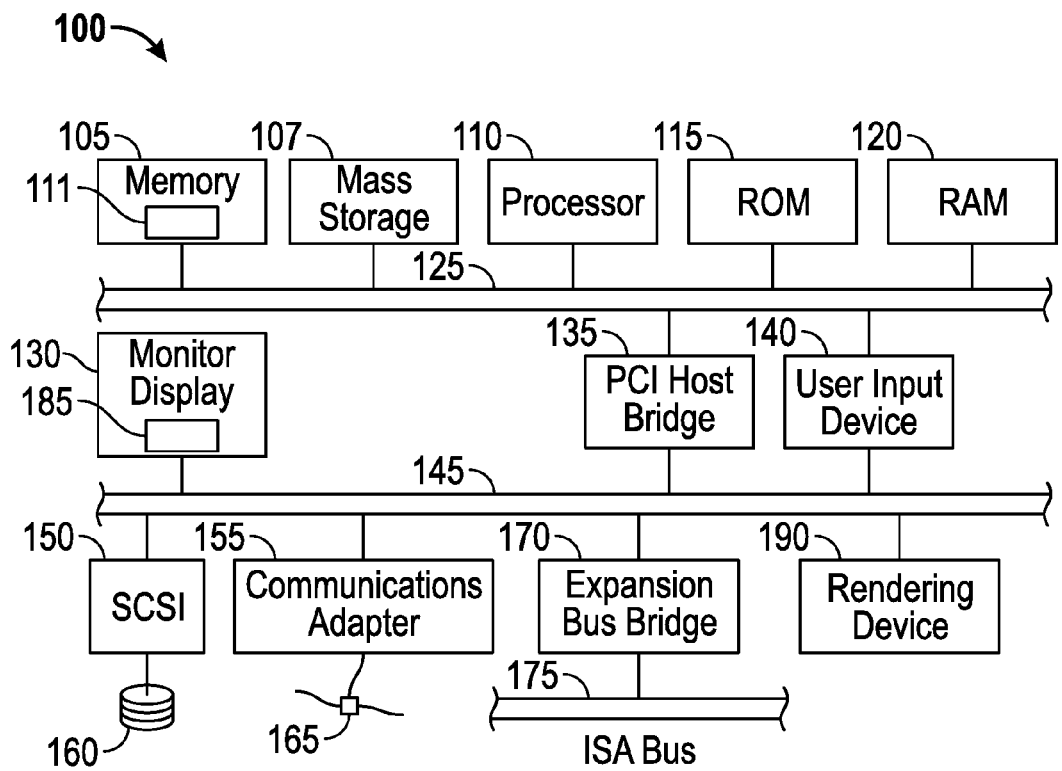
FIG. 1 illustrates an exemplary block diagram of an exemplary data-processing apparatus, which can be utilized for processing data, in accordance with the disclosed embodiments.

The particular values and configurations discussed in these non-limiting examples can be varied and are cited merely to illustrate at least one embodiment and are not intended to limit the scope thereof.

The embodiments will now be described more fully hereinafter with reference to the accompanying illustrations, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. To maintain consistency, further reference of the terms "sensing", "sense", "sensed", "sensor" and\or "scanning", "scan", "scanned", scanner" will be referenced solely as "scanning", "scan", "scanned" or "scanner" respectively (except in some of the comments).

As will be appreciated by one skilled in the art, one or more of the disclosed embodiments can be embodied as a method, system, or computer program usable medium or computer program product. Accordingly, the disclosed embodiments can in some instances take the form of an entire hardware embodiment, an entire software embodiment or an embodiment combining software and hardware aspects all generally referred to herein as a "module". Furthermore, the disclosed embodiments may take the form of a computer usable medium, computer program product, a computer-readable tangible storage device storing computer program code, or said computer program code comprising program instructions executable by said processor on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

The disclosed embodiments are described in part below with reference to flowchart illustrations and/or block diagrams of methods, systems, computer program products, and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

FIG. 1 illustrates a block diagram of a sample data-processing apparatus 100, which can be utilized for an improved contactless fingerprint scanner apparatus. Data-processing apparatus 100 represents one of many possible data-processing and/or computing devices, which can be utilized in accordance with the disclosed embodiments. It can be appreciated that data-processing apparatus 100 and its components are presented for generally illustrative purposes only and do not constitute limiting features of the disclosed embodiments.

As depicted in FIG. 1, a memory 105, a mass storage 107 (e.g., hard disk), a processor (CPU) 110, a Read-Only Memory (ROM) 115, and a Random-Access Memory (RAM) 120 are generally connected to a system bus 125 of data-processing apparatus 100. Memory 105 can be implemented as a ROM, RAM, a combination thereof, or simply a general memory unit. Module 111 includes software module in the form of routines and/or subroutines for carrying out features of the present invention and can be additionally stored within memory 105 and then retrieved and processed via processor 110 to perform a particular task. A user input device 140, such as a keyboard, mouse, or another pointing device, can be connected to PCI (Peripheral Component Interconnect) bus 145.

Data-processing apparatus 100 can thus include CPU 110, ROM 115, and RAM 120, which are also coupled to a PCI (Peripheral Component Interconnect) local bus 145 of data-processing apparatus 100 through PCI Host Bridge 135. The PCI Host Bridge 135 can provide a low latency path through which processor 110 may directly access PCI devices mapped anywhere within bus memory and/or input/output (I/O) address spaces. PCI Host Bridge 135 can also provide a high bandwidth path for allowing PCI devices to directly access RAM 120.

A communications adapter 155, a small computer system interface (SCSI) 150, and an expansion bus-bridge 170 can be attached to PCI local bus 145. The communications adapter 155 can be utilized for connecting data-processing apparatus 100 to a network 165. SCSI 150 can be utilized to control high-speed SCSI disk drive 160. An expansion bus-bridge 170, such as a PCI-to-ISA bus bridge, may be utilized for coupling ISA bus 175 to PCI local bus 145. Note that PCI local bus 145 can further be connected to a monitor 130, which functions as a display (e.g., a video monitor) for displaying data and information for a user and also for interactively displaying a graphical user interface (GUI) 185. A user actuates the appropriate keys on the GUI 185 to select data file options. Note that the term "GUI" generally refers to a type of environment that represents programs, files, options, and so forth by means of graphically displayed icons, menus, and dialog boxes on a computer monitor screen. A rendering device 190 can also be connected to the PCI local bus 145.

The embodiments described herein can be implemented in the context of a host operating system and one or more modules. Such modules may constitute of hardware modules such as, for example, electronic components of a computer system. Such modules may also constitute software modules. In the computer programming arts, a software "module" can be typically implemented as a collection of routines and data structures that performs particular tasks or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, music program scheduling, etc.

Figure 2:
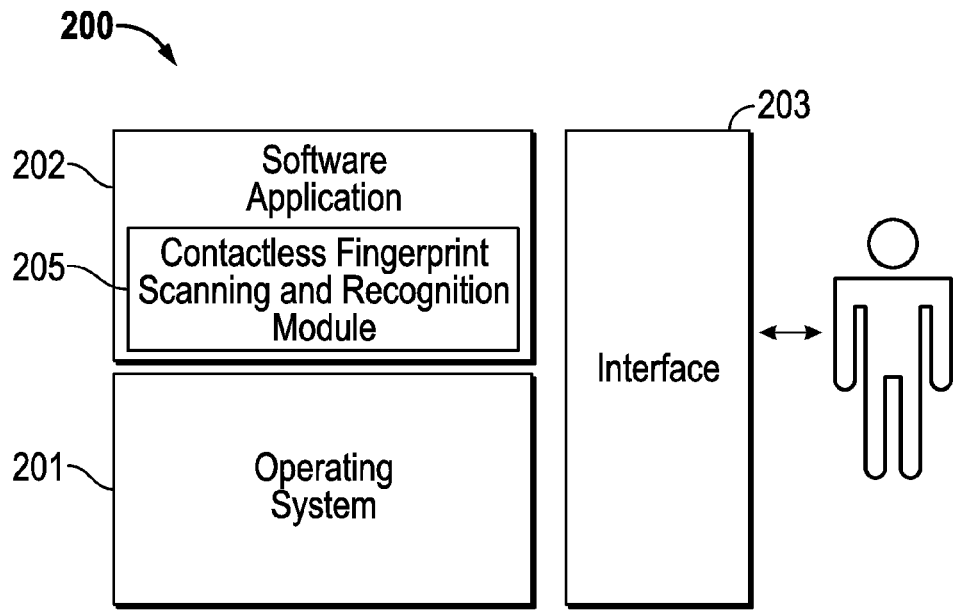
FIG. 2 illustrates an exemplary schematic view of an exemplary software system including an operating system, application software, and a user interface, in accordance with the disclosed embodiments.

FIG. 2 illustrates a schematic view of a software system 200 including an operating system, application software, and a user interface for carrying out the disclosed embodiments. Computer software system 200 directs the operation of the data-processing system 100 depicted in FIG. 1. Software application 202, stored in main memory 105 and on mass storage 107, includes a kernel or operating system 201 and a shell or interface 203. One or more application programs, such as software application 202, may be "loaded" (i.e., transferred from mass storage 107 into the main memory 105) for execution by the data-processing system 100. The data-processing system 100 receives user commands and data through the interface 203, as shown in FIG. 2. The user's command input may then be acted upon by the data-processing system 100 in accordance with instructions from operating module 201 and/or application module 202.

The interface also serves to display and recognize, whereupon the user may supply additional inputs or terminate the session. In an embodiment, operating system 201 and interface 203 can be implemented in the context of a "Windows" system. It can be appreciated, of course, that other types of systems are possible. For example, rather than a traditional "Windows" system, other operation systems such as, for example, Linux may also be employed with respect to operating system 201 and interface 203. The software application 202 can include a contactless fingerprint scanning and recognition module 205. The software application 202 can also be configured to communicate with the interface 203 and various components and other modules and features as described herein.

Figure 3:
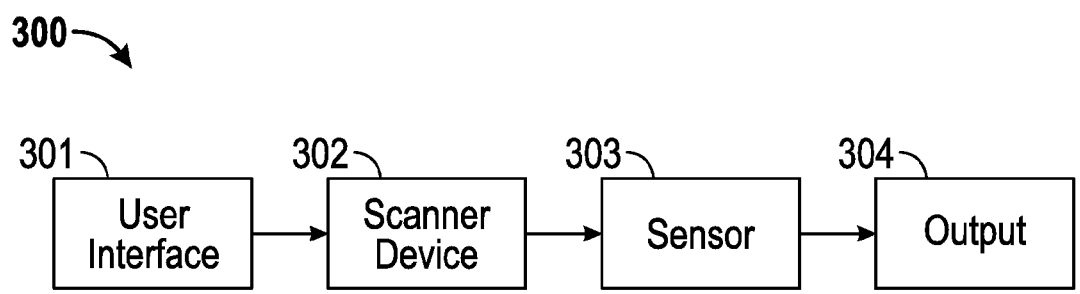
FIG. 3 illustrates an exemplary contactless fingerprint scanner operating system, in accordance with the disclosed embodiments.

FIG. 3 illustrates an exemplary contactless fingerprint scanner operating system 300, in accordance with the disclosed embodiments. System 300 includes: 1) a user interface 301 (e.g., on/off button, settings), 2) scanning device 302 (e.g., s/w & h/w—main component—has the "inner workings"), and 3) sensor 303 (e.g., collects the data from scanning. The sensor 303 can comprise a separate component, a remote sensor input, a base platform, dedicated space, or a light-source plus sensor, etc. The sensor 303 captures data from a scanned hand and orients the placement of the target to be scanned). The system 300 also includes: 4) output 304 (e.g., captured data, images, via—monitor display, printed, stored (disc, HD, ROM, etc.), processed, transferred, converted, measured, histogram, memory, etc.). The disclosed embodiments first validate a scanner's ability to capture a simulated ridge pattern. A test pattern is created that presents a friction ridge pattern structure with a predictable geometric pattern to the scanner. Second, a scanner's ability for capturing a simulated minutiae pattern is validated. A test pattern is created that presents a basic point-minutia pattern layout to the scanner. Third, a scanner's capture resolution is evaluated or validated by creating a test pattern that allows for the verification of a scanner's capture resolution.

The goal of such a system is the design basis for evaluating a biometric capture device that captures fingerprint features without contact between the subject and the biometric scanner. The device must also generate images from captures that are of a minimally acceptable forensic quality for effective identification and verification purposes and to ensure interoperability with legacy systems and devices. Certification and standards for fingerprint scanners in the United States require some sort of calibration target of known properties that can be imaged by the scanning device being tested. The resulting capture from the known target can then be examined as an image for fidelity to the original sample, consistency, and compliance with the requirements.

Similar to geometric features captured by traditional contact-based fingerprint scanners, a reference calibration target with known 3D geometric features can be created for use in contactless scanners. The target is presented to the contactless scanner for the scanner to scan and capture the geometric features of the target. Images or surface plots can then be created from the data captured. Given known or predefined feature geometry, the resulting images or surface plots can then be used to gauge the fidelity of the scanner to the original presented target. Such a target also provides a basis for comparison between different contactless scanners. The targets are intended for use, in part, for type calibration, whereby a particular scanning device model or system can be validated for proper operation by type calibration testing using the target. This testing is useful for model/system evaluation. Other similar devices from a particular model/lot or system would normally not require testing for a representative model evaluation. To test for confirming repeatability or for quality control in manufacturing, however, more than one of a particular model would normally be tested.

In order to build a reference target (i.e., calibration target, or target) suitable for the task at hand, the following key criteria can be utilized:

Mechanical Stability: The target should be able to retain its shape after manufacturing and be able to withstand typical handling stress.

Thermal Stability: The target should be able to maintain its structural and optical characteristics throughout a reasonable temperature range.

Optical and Structural Contrast: The target should be able to provide some optical contrast as well as three-dimensional structural features to mimic surface features of a fingerprint.

Reproducible: The target should be reproducible with a reasonably acceptable level of effort and automated fashion.

Several types of materials available can be utilized to construct the target. These types of materials include, for example, aluminum, steel, various types of plastics and polymers, titanium, graphite, and glass. Aluminum is a material that can be machined, etched or ablated, and is mechanically stable at expected usage temperatures. Aluminum is typically available in standardized alloys with published compositions that provide for repeatability of design. The device can be constructed using typically two alloys of aluminum, 6020 and 6061, as displayed in Table 1 below.

| | Alloy Composition (all values in %, with balance of 100% being Aluminum) | | | | | | | | | |
|---|---|---|---|---|---|---|---|---|---|---|
| Alloy Name | Si | Fe | Cu | Mn | Mg | Cr | Zn | Ti | Pb | Sn |
| 6020 | 0.4-0.9 | 0.5 | 0.3-0.9 | 0.35 | 0.6-1.2 | 0.15 | 0.2 | 0.15 | 0.05 | 0.9-1.5 |
| 6061 | 0.4-0.8 | 0.7 | 0.15-0.4 | 0.15 | 0.8-1.2 | 0.04-0.35 | 0.25 | 0.15 | | |

The scanner device should be able to maintain its structural and optical characteristics under a controlled ambient temperature range of 23°±2° C. (73°±3.6° F.). The selection of Aluminum provides many benefits such as low cost and machinability, the coefficient of thermal expansion (α) for Aluminum is higher than most other materials. Given $\alpha=22.2\times10.^6/C$ with a pattern area (L) of 16 mm, change in the position of features on the surface of the target can be quantified as for a 2° C. change in temperature using the equation:

$$\Delta r = \alpha r \Delta T \text{ and } \Delta h = \alpha h \Delta T$$

Given the equation above, Δr and Δh is calculated to be 22.2 micrometers per meter per degree of temperature change in length and radius of the cylinder, or 44.4 micrometers per meter at the maximum and minimum values of the test temperature range. Given the dimensions of sample test target, a radius of 9,547 mm was measured, resulting in a circumference 59.9855 mm. The change in radius due to a 2° C. rise or fall from 23° C. will respectively expand the cylinder to 59.9882 mm or contract it to 59.9829 mm. Changes due to thermal variance in the specified range are expected to be temporary and transient, and will not result in any permanent physical change in the target or adversely affect geometric features manufactured into the target for or during scanner testing.

The target should be able to provide some optical contrast as well as 3D structural features to mimic surface features in the fingerprinting area of a real finger. The selection of aluminum as the subject material allows for both the machining of surface features onto the medium to create 3D surface contrast and for anodization to enable the generation of optical contrast.

Figure 4:
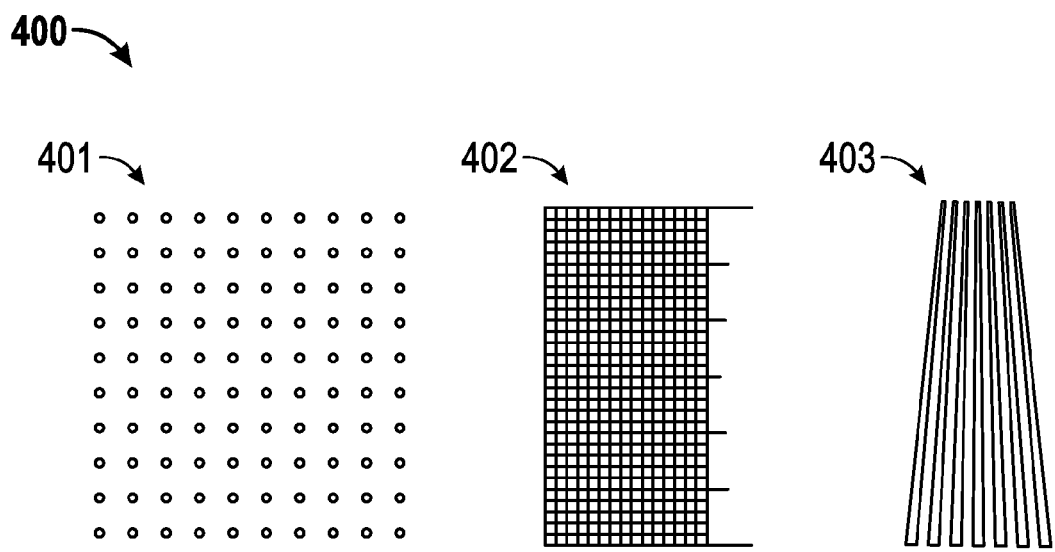
FIG. 4 illustrates an exemplary pictorial illustration of exemplary test patterns, in accordance with the disclosed embodiments.

FIG. 4 illustrates an exemplary pictorial illustration of exemplary test patterns, in accordance with the disclosed embodiments. The typical characteristics used for state-of-industry application of fingerprints for identification and verification include the ridge structure of a finger, including where ridges begin or end, and bifurcations in the ridge structure. While it is possible to mimic a human ridge structure on a target for the verification of anthropometric fidelity, it is easier to quantify the ability of a device to capture certain features using basic primitive geometric patterns and constructs. A set of three test patterns was created: a dot (simulated "minutiae") pattern 401, a grid (simulated "ridge") pattern 402, and a resolution pattern 403, as illustrated in FIG. 4.

Figure 5:
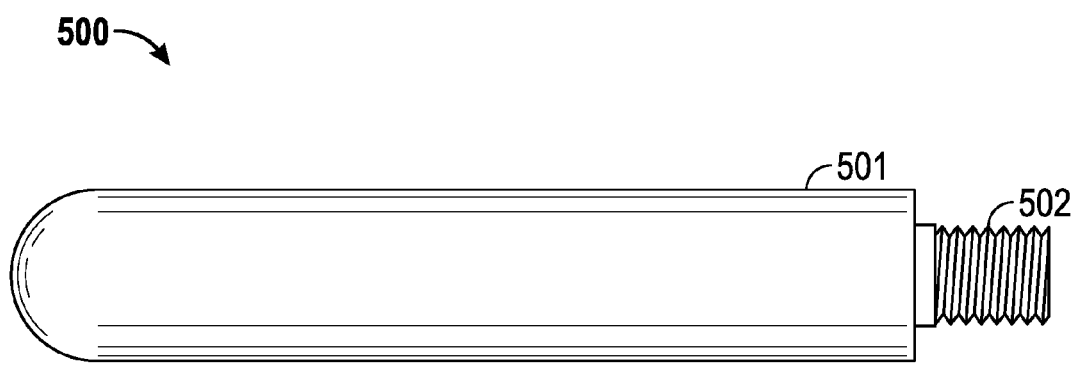
FIG. 5 illustrates an exemplary pictorial illustration of a blank (i.e., absent test patterns) calibration target cylinder with threading, in accordance with the disclosed embodiments.

Anthropometric fidelity for the human finger can mean one or more physical properties. A short list of such properties includes:

Finger dimensions: digit length, circumference, etc.
Thermal characteristics
Mechanical Properties
Galvanic skin response
Optical properties unique to the physiology of a human
Structural properties unique to the physiology of a human finger FIG. 5 illustrates an exemplary pictorial illustration 500 of a blank (i.e., absent test patterns) calibration target cylinder 501 with threading 502, in accordance with the disclosed embodiments. Based on the finger dimension data, artifact dimensions of 90 mm (length) and 19.1 mm (width/diameter) were selected. The artifact was designed as an exemplary cylinder 501 with a spherical tip, as illustrated in the exemplary pictorial illustration 603 in FIG. 6. A threaded stud 502 has also been specified to allow for mounting to an optional carrier mechanism. The threaded stud 502 was specified to be 15 mm long with M12×1.75 threads machined on to it. The selection of the artifact's length (i.e., 90 mm) was based on accommodating a representative length of a human finger.

Some fingerprint scanners capture features of a finger by a method utilizing optical properties of the finger surface rather than the topological structure. It is therefore critical to have both 3D topographical structures (and thereby 3D "contrast") as well as optical contrast marking those structures. To achieve this, the target material was prepared by a processed referred to as anodization and thus becomes anodized, where the exposed parts of the aluminum cylinder take on a black or near-black hue. When the anodized cylinder is machined to create a pattern on the outermost surface, the anodized material is removed where the pattern is machined and exposes the lighter hued natural aluminum material allowing for an easily visible contrast gradient between the two materials.

The ability to test the scanner effectively relies heavily on the ability to verify the fidelity of the measurements derived from the capture made by the scanner. Therefore, one of the primary design goals was to build a target that demonstrates fidelity to some of the basic features of a fingerprint while maintaining a primitive geometric shape that can be measured and verified objectively. These basic features for the purpose of this experiment were identified as a basic ridge pattern as well as a basic minutiae pattern.

Figure 6:
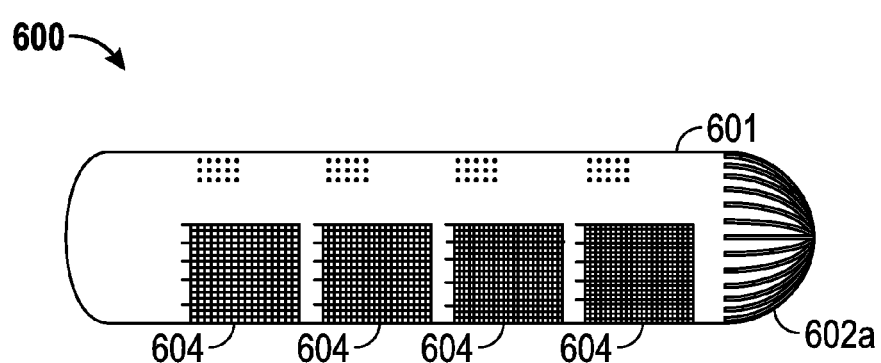
FIG. 6 illustrates an exemplary pictorial illustration of a simulated ridge test pattern, in accordance with the disclosed embodiments.
Figure 6:
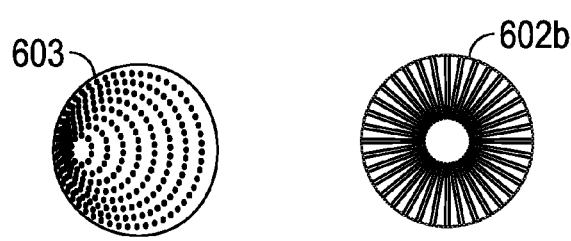

FIG. 6 illustrates an exemplary pictorial illustration 600 of a simulated ridge/minutiae pattern on a cylindrical target 601, in accordance with the disclosed embodiments. For the simulated ridge test pattern, a cylindrical target 601 was fabricated with four patches of grid lines 604. The tip of the cylinder was designed as a perfect hemisphere 602a with its radius equal to the radius of the cylinder body. The hemisphere 602a is an oblique view of the hemisphere comprising the end of the target. Hemisphere 602b is a polar view of the hemisphere 602a comprising the end of the target.

For the simulated minutiae test pattern and the scanning resolution test pattern, a cylindrical target with four patches of repeating dot patterns was fabricated, in accordance with FIG. 6. The tip of the cylinder was designed as a perfect hemisphere with its radius equal to the radius of the cylinder body. A threaded stud was specified in the design for future extensibility/ability to mount the finger into a false palm target.

It will be appreciated that variations of the above-disclosed and other features and functions, or alternatives thereof, may be desirably combined into many other different systems or applications. Furthermore, it will be appreciated that various presently unforeseen or unanticipated alternatives, modifications, variations or improvements therein may be subsequently made by those skilled in the art, which are also intended to be encompassed by the following claims.

What is claim is:

1. A method for contactless fingerprint scanning calibration, said method comprising:
   providing a dot pattern, a grid pattern, and a resolution pattern comprising diverging lines on an anodized calibration target cylinder wherein said dot pattern, said grid pattern, and said resolution pattern provide a topographical contrast;
   providing an optical contrast with said anodized calibration target cylinder; and
   scanning said anodized calibration target with a contactless three-dimensional fingerprint scanner to calibrate said contactless three-dimensional fingerprint scanner.

2. The method of claim 1 further comprising:
   providing a simulated fingerprint ridge test pattern on said anodized calibration target cylinder, wherein said simulated fingerprint ridge test pattern comprises a predictable geometric ridge pattern.

3. The method of claim 1 further comprising:
   coloring exposed surfaces of said anodized calibration target cylinder black; and
   machining other surfaces of said anodized calibration target cylinder to be naturally aluminum colored.

4. The method of claim 1 further comprising:
   generating a calibration target image from said scanned calibration target.

5. The method of claim 1 further comprising:
   forming four patches of said grid lines on said anodized calibration target cylinder.

6. The method of claim 1 further comprising:
   configuring said contactless fingerprint scanner calibration target to mimic surface features in a fingerprinting area of a real finger.

7. An apparatus for scanner calibration comprising:
   a calibration target cylinder anodized to provide an optical contrast;
   a dot pattern, a grid pattern, and a resolution pattern configured on said calibration target cylinder to provide a topographical contrast; and
   wherein said calibration test target is configured to be scanned by a contactless three-dimensional fingerprint scanner to calibrate said contactless three-dimensional fingerprint scanner.

8. The apparatus of claim 7 further comprising a ridge pattern structure configured on said calibration test target cylinder.

9. The apparatus of claim 7 further comprising a basic point-minutia pattern configured on said calibration test target cylinder.

10. The apparatus of claim 7 further comprising a test pattern recognized by said scanner to validate a capture resolution of said scanner.

11. The apparatus of claim 7 further comprising a simulated fingerprint ridge test pattern configured on said calibration test target cylinder.

12. The apparatus of claim 7 wherein said calibration test target is aluminum.

* * * * *